United States Patent
Moorhead

[15] 3,703,088
[45] Nov. 21, 1972

[54] CONTAINER FOR HANDLING CHILLED PRODUCT

[72] Inventor: Glenn E. Moorhead, 3550 North Lakeshore Drive, Chicago, Ill. 60657

[22] Filed: March 31, 1971

[21] Appl. No.: 129,753

[52] U.S. Cl. .................. 62/430, 62/382, 62/458, 62/459, 62/257
[51] Int. Cl. .......................................... F25d 11/00
[58] Field of Search ........ 62/382, 457, 458, 459, 246, 62/257, 430

[56] References Cited

UNITED STATES PATENTS

| | | |
|---|---|---|
| 343,301 | 6/1886 | Currier ..................... 62/382 |
| 1,714,727 | 5/1929 | Poletis ..................... 62/382 |
| 1,909,265 | 5/1933 | Gimbel ..................... 62/458 |
| 2,504,217 | 4/1950 | Nelson ..................... 62/257 |

*Primary Examiner*—William J. Wye
*Attorney*—Edward T. McCabe, Charles E. Bouton, Robert E. Blankenbaker and W. C. Davis

[57] ABSTRACT

A combination refrigerated storage cabinet and dispensing plate for maintaining table fats, such as butter patties, at cold but spreadable temperatures over extended periods of time. The apparatus includes a refrigerant unit, a storage compartment, and an easy-access dispensing plate which enables rapid removal of individual servings of the refrigerated table fats.

10 Claims, 2 Drawing Figures

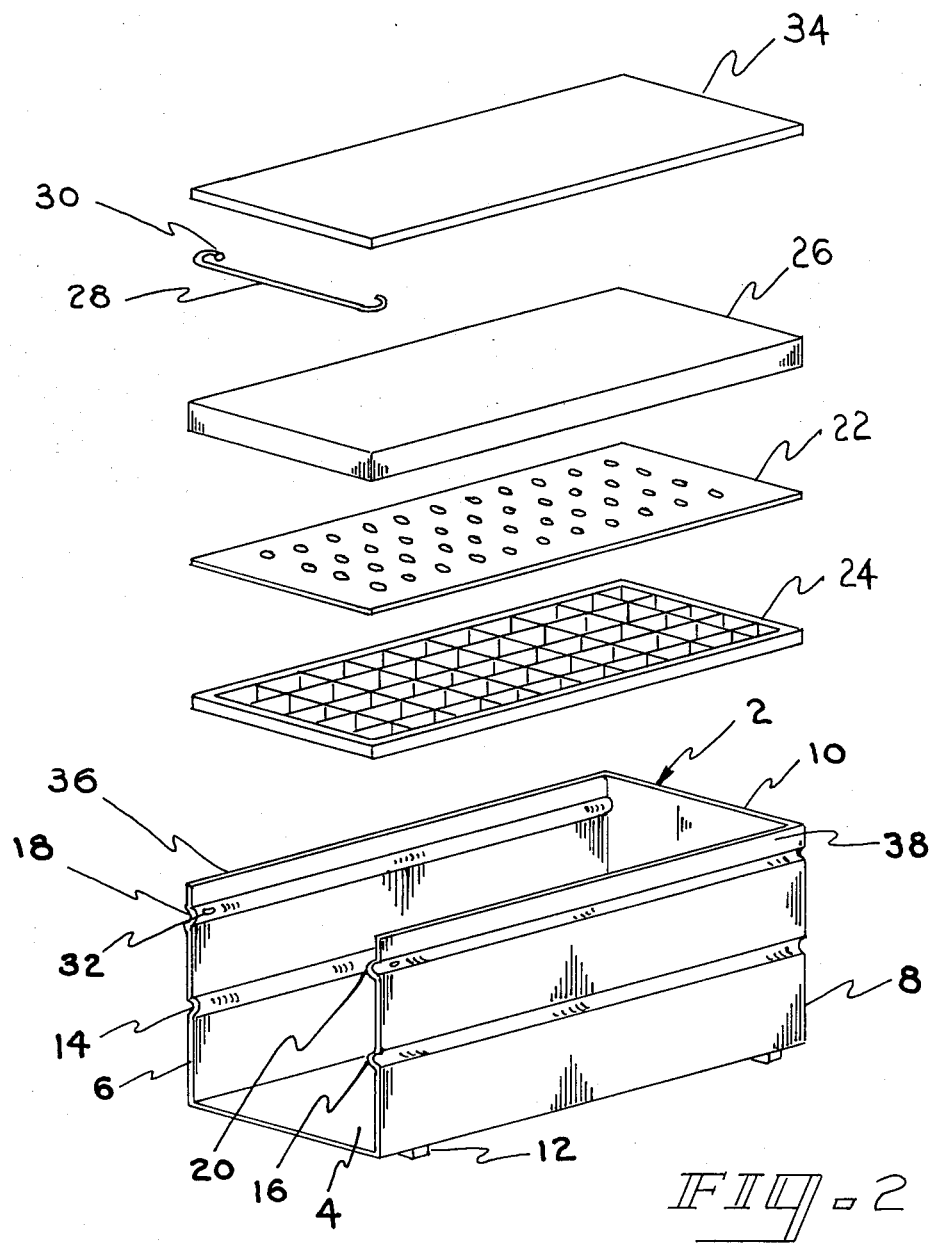

CONTAINER FOR HANDLING CHILLED PRODUCT

This invention relates to a refrigerating apparatus for holding and serving table fats in a chilled condition. More particularly, this invention relates to a combination storage cabinet and dispensing plate which is capable of maintaining table fats and other food servings at cold but spreadable temperatures for extended periods of time.

This invention is applicable to many food products, and especially to table fats, such as butters and margarines, when it is desired to serve them chilled. However, for convenience in describing this invention, the terminology "butter" will be used consistently throughout the description, and should be understood to refer to all table fats and other food servings.

This invention has particular application to the holding and dispensing of individual patties of butter. The butter may be whipped (aerated) or non-whipped. Also, the butter patties may be plain or ornamental. Ornamental patties include those having designs that are engraved (depressed) and embossed (raised). Moreover, the patties may be of any convenient size and shape. Generally, commercial patties sold to restaurants, hotels, institutions and catering services range in size from about ¼ inch to about ¾ inch in thickness, and from about ¾ inch to about 1-½ inches in length, width or diameter. Patties vary in weight accordingly, so that from 18 to 150 of such patties may be required per pound of butter supplied. In general, the weight of a patty may range from about 0.1 ounce to about 0.9 ounce, depending on size, degree of air inclusion, etc.

Butter patties are generally supplied to hotels, restaurants, etc. by one of several methods of distribution. The oldest method involves supplying a thin slab (about ⅛ inch thick) of hard (chilled) butter that has been scored into planular divisions that define the outline of each pat of butter. A typical slab may be a 5 inch by 6 inch rectangle with 20, 24 or 30 patties per slab, three slabs to the pound. Each slab is placed on a sheet of parchment paper having a width equal to that of the slab and having a length sufficient to completely overwrap the slab lengthwise. These overwrapped slabs of butter are distributed in a stack of 15 slabs (a 5 pound package). Each pat of butter remains attached to adjacent patties until preparation for serving, at which time the slabs are broken along the score lines to yield individual butter patties.

Another method of distribution of butter patties involves supplying individually wrapped patties. Each butter pat rests on a flat paper board chip, approximately 1-⅞ inch by 1-⅞ inch, and is covered by a piece of parchment paper, approximately 1-½ inch by 1-¾ inch. These individually wrapped patties are packed in paper board trays, 20 to 60 trays to a shipping container. Usually, the butter patties packaged in this manner are of a size that requires either 72 patties per pound (36 per tray) or 90 per pound (45 per tray).

A newer method of distributing butter patties and other food servings utilizes plastic trays having a plurality of individual mold cavities formed within the tray. A single butter pat is held within each separate mold of the plastic tray, usually 20 to 60 patties per tray, with 40 patties per tray common. Often, each butter pat will first be placed on an individual paper board chip that is creased and cut so that it can be folded up along all four sides to a height slightly greater than the height of the butter pat. Patties so wrapped may be placed in the mold cavities of plastic trays, or alternatively, may be packaged in rectangular paper board trays having side and end walls.

Upon receipt of the above-described slabs, trays, or individually wrapped butter patties, the restaurant must insure that the patties remain chilled until they are served to consumers. The temperature at which the patties are served is very important. Patties at a temperature of 35° F. or less are hard and brittle, and almost impossible to spread on bread or the like. On the other the other hand, patties that are retained at room temperature, such as 72° F., are also unsuitable. At normal room temperatures, butter oils-off and loses its natural appearance and shape. Moreover, butter retained at room temperature loses its flavor and becomes unpalatable. Therefore it is very important to retain the patties at temperatures such that the patties are cold but spreadable. Generally, the patties should be retained at a temperature of from about 40° F. to about 60° F. immediately prior to serving to customers, and preferably from about 45° F. to about 55° F.

Attempting to maintain the butter patties in such a temperature range has caused considerable difficulties in the restaurant business. Retaining patties in a refrigerator until serving to customers results in great inconvenience in that the waitress must go to an inconveniently located refrigerator to obtain butter for serving each new customer. Butter pat dispensers have been designed for use in self-service cafeterias. These devices were developed to dispense the type of butter patties that are separately mounted on flat, individual paper board chips. Such dispenser devices are not operable to dispense sheets or trays of butter patties as previously described. Most non-self-service restaurants have resorted to the use of pans containing crushed ice, ice cubes, or ice water in order to keep butter patties chilled. These ice pans are located at various points throughout the restaurant, as at service islands, to enable easy access by the waitresses. However, the use of such ice or ice-water pans is plagued with many attendant difficulties. The following represent the major problems entailed in the use of such ice chilling systems:

1. It is necessary to replace the ice or ice-water frequently during the day in order to keep the butter patties chilled. This, of course, involves considerable inefficiency.
2. Storing a large number of butter patties in an ice bath, with several people removing patties therefrom, poses sanitation problems for the restaurant.
3. The butter patties must be removed from the ice bath by a method known as "fork-jabbing" which usually results in mutilation of many of the butter patties during the day.
4. The butter patties tend to lump together in aggregates of several patties in the ice bath, and thus become difficult to separate without mutilation.
5. Holding the butter patties in an ice bath over a period of time causes bleaching of the patties, thus detracting from their appearance.

6. Retaining the butter patties in direct contact with ice results in a hard butter pat which will not spread satisfactorily on bread, toast, crackers or the like.

Considerable work has been conducted in the prior art in order to alleviate these problems. In U. S. Pat. Nos. 3,240,030 and 3,383,880 there are disclosed devices for retaining a small number of patties (about six to eight) at proper temperatures after serving the patties to a table. Both of these patents are directed to relatively small devices which can be conveniently placed on a table, and which will retain a few patties at cold but spreadable temperatures only over the short period of time required to consume a meal. These devices, of course, do not solve the problem of retaining a large number of patties at cold but spreadable temperatures over longer periods of time prior to service to a table.

Prior patents that are directed to the same problems as the present invention, include U. S. Pat. Nos. 3,263,840 and 3,308,635. The apparatus disclosed in the first of these references employs a salt-ice coolant to externally cool a water bath in which patties of butter may be retained. The use of such a device involves many of the same problems common to an ice system, namely: lack of sanitation, bleached patties, and frequent replacement of the coolant. The apparatus disclosed in the second reference mentioned above is an electrically energized, refrigerated dispensing plate. The primary difficulty with such a device is the necessary expense entailed in its acquisition and maintenance. Also, the device is not amenable to holding multiple layers of butter patty sheets or trays. Moreover, the device must be located in the immediate proximity of an electrical outlet.

Therefore, there is a continuing need in the food service business for an economical, easy-to-maintain device for storing and serving large numbers of patties at proper temperatures over extended periods of time without damaging the appearance and shape of the patties.

Accordingly, it is a principal object of the present invention to provide an improved apparatus for economically holding and serving table fats and other food servings in a refrigerated condition.

It is another object of the present invention to provide an improved apparatus for maintaining a large number of butter patties at temperatures at which the butter is cold but spreadable.

It is also an object of the present invention to provide an improved apparatus for using a dry cold in dispensing butter patties, thus eliminating the heretofore mentioned problems of chilling butter patties with ice.

It is a further object of the present invention to provide an improved apparatus for dry cold storage of butter patties over extended periods of time at restaurant service islands.

Generally, the present invention is an apparatus for holding and dispensing butter patties and other food servings, said apparatus comprising a refrigerant element, a refrigerated storage cabinet, and a dispensing plate which enables rapid removal of many butter patties therefrom by a server.

Further objects and advantages of the present invention will become clear from the following description of the invention taken in conjunction with the drawings, wherein:

FIG. 2 is a perspective view of an embodiment of the invention, exploded to show the component parts.

Figure 1:
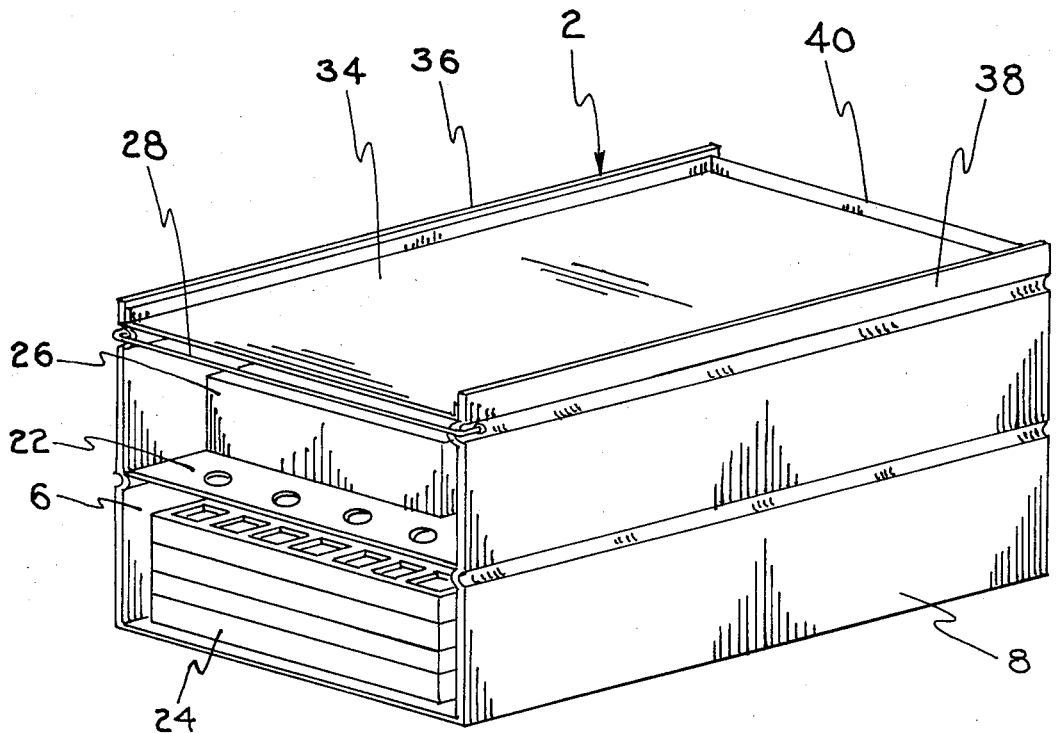
FIG. 1 is a perspective view of one embodiment of the invention.

The apparatus of the present invention comprises a rectangular cabinet, generally 2, which is formed as an integrally connected unit including a base panel 4, upwardly extending side walls 6 and 8, and upwardly extending end panel 10. The cabinet is mounted on legs 12. Two pairs of parallel shelf-retaining shoulders, shown in FIG. 2 as 14, 18 and 16, 20, are integrally provided in a direction parallel to the base panel 4, lengthwise along each of the two side walls 6 and 8. These shoulders need not extend the full length of the side walls.

A middle shelf 22 is removably positioned within cabinet 2 parallel to base panel 4, and aligned on shelf-retaining shoulders 14 and 16. The height of shoulders 14 and 16 above base panel 4 is such that up to about six plastic trays 24 of butter patties or up to about ten layers of butter pat slabs can be stored one on top of the other in the compartment formed between base panel 4, side walls 6 and 8, end panel 10 and shelf 22. Preferably, the storage volume will have dimensions sufficient to hold at least four trays of patties or about seven layers of patty slabs. Also, the distance between side walls 6 and 8, and the height of the shoulders 14 and 16, is such that when the trays or slabs of butter patties 24 are stacked on base panel 4, chilled air is free to circulate over and along the sides of trays 24. Preferably, shelf 22 is perforated in order to promote air flow through the perforations and down along side walls 6 and 8.

A portable refrigerant element 26 is removably positioned on top of shelf 22. Preferably the refrigerant element 26 is sufficiently large so as to substantially cover the entire surface area of the shelf 22. My invention also contemplates the use of two or more smaller refrigerant elements positioned adjacent one another on shelf 22. Refrigerant element 26 is preferably one or more re-usable cold packs containing a coolant material having a freezing point of less than about 32° F. The cold pack container body may be constructed from any leak-tight material that will conduct heat, such as metal, plastic or rubber. A preferred cold pack container consists of a transparent, semi-rigid plastic material, such as polypropylene, having substantially rectangular dimensions. Once the coolant material has been introduced into the cold pack reservoir, the cold pack is permanently sealed to prevent future escape of the coolant.

The refrigerant material (coolant) held within the cold pack should have a freezing point below about 32° F., but usually above about 0° F. This will insure that the refrigerant can be completely frozen by holding it in a conventional commercial freezer such as would be found in a restaurant. A wide variety of coolants may be utilized. For example, aqueous solutions of alcohols and glycols, such as glycerine and ethylene glycol, may be used as the refrigerant. Preferably, however, the refrigerant material is a non-toxic gel having a freezing point between about 0° F. and 32° F. These materials may be aqueous solutions of a solid gel, such as the glycollate gels. For example, a glucose-sodium glycollate gel could be used.

The cold pack refrigerant should be selected so that when the cold pack is frozen, melting of the refrigerant will require from about 6 to 15 hours, and preferably from about 10 to about 15 hours, at normal room temperatures. By varying the solids concentration of the aqueous gel, the freezing point and melting characteristics of the refrigerant can be modified as desired. Any of the commercially available cold packs, such as those manufactured by Flambeau Plastics Corp. under the name KOOL-PAC, will usually require 10 to 15 hours to melt at room temperatures, and are thus recommended for use as the refrigerant element 26 of this invention. It is desirable of course, to employ a cold pack that will remain frozen throughout a restaurant's normal business day so that the cold pack need not be changed during the day. In this manner, a restaurant that has a 12 hour business day, for example, could place a cold pack on shelf 22 at the beginning of the day, and not have to remove it for re-freezing until closing time. The cold pack would be refrozen overnight, and thus ready for another day's service.

Although the refrigerant element 26 of the present invention is primarily directed to cold packs of the commercial variety, cold packs containing water or aqueous salt solutions could also be advantageously employed. Moreover, refrigerant element 26 could also be a tray of crushed ice or an ice water bath. However, the use of an ice system would require frequent changing during the day, and therefore is not nearly as advantageous as a cold pack system.

A transverse brace member 28, while not essential, may be utilized to give added stability to cabinet side walls 6 and 8. Brace member 28 comprises a rigid metal rod with hooks 30 at each end thereof. The hooks are fitted through holes 32 that are drilled through the leading ends of each of the tray retaining shoulders 18 and 20. Brace member 28 will prevent outward bowing of the side walls 6 and 8.

A dispensing plate 34 comprising a rectangular panel is removably positioned across upper retaining shoulders 18 and 20 and parallel to shelf 22. The plate may have upwardly contoured sides (not shown) along the length thereof in order to increase its rigidity. The plate retaining shoulders 18 and 20 are positioned somewhat below the top edges of side walls 6 and 8 so that an upper perimeter 36, 38, 40 is formed by the uppermost portions of side walls 6, 8 and end panel 10. Upper perimeter 36, 38 and 40 acts to retain individual patties or patty trays securely on dispensing plate 34. Moreover, upper perimeter 36, 38 and 40 also helps to break up the normal circulation of air across the top of butter patties held on plate 34, thus decreasing heat transfer from room temperature air currents to the chilled butter patties.

It is important that substantially all of the lower surface of dispensing plate 34 be in surface contact with the refrigerant element 26 in order to insure good heat transfer away from the butter patties or individual food servings which may be held for immediate use on dispensing plate 34. Plate 34 has dimensions such that it can hold a commercial-sized plastic tray, or paper board tray, or a slab of patties, or a plurality of butter patties on individual chips laid out over the tray.

In accordance with the present invention, one such tray or slab of butter patties, or a plurality of individual patties, can be placed on the dispensing plate 34 while up to 6 other trays or up to 10 butter slab layers are simultaneously held in the refrigerated cabinet storage area. In this manner, it is possible to retain hundreds of patties at cold but spreadable temperatures at service stations located at strategic points in the restaurant. Thus the labor-wasting requirement of obtaining butter patties from an inconveniently located refrigerator is obviated. Moreover, since the patties are refrigerated by a dry cold, the manifold undesirable consequences attendant with the use of ice systems is avoided.

It is important that shelf 22 and dispensing plate 34 be constructed from materials that are good thermal conductors, i.e., good conductors of heat. Although several metals would be suitable, it is preferred to use stainless steel to construct shelf 22 and plate 34. Cabinet 2 could be constructed from a non-thermal conductor such as styrofoam. For strength and ease of washing however, it is preferred to make cabinet 2 out of stainless steel. In this regard, it should be noted that the ease of removal of shelf 22, plate 34, and refrigerant element 26, facilitates cleaning of the cabinet.

In operation therefor, at the beginning of a restaurant business day, a waitress need only place a frozen cold pack or several cold packs on shelf 22, place several trays or slabs of patties in the storage compartment, and place a single tray or slab of patties, or a plurality of individual patties, on dispensing plate 34. The frozen cold pack will be sufficient to maintain all the patties at cold but spreadable temperatures throughout the day. When all the patties on the dispensing plate have been used, the waitress simply replaces the depleted tray or sheet with a filled tray or sheet that has been held in the refrigerated cabinet storage area. In this manner, large numbers of patties may be conveniently refrigerated at service stations strategically located within the restaurant.

Obviously, many modifications and variations of the invention as hereinbefore set forth may be made without departing from the spirit and scope thereof, and therefore, only such limitations should be imposed as are indicated in the appended claims.

I claim:

1. An apparatus for storing and dispensing individual food servings at cold but spreadable temperatures, said apparatus comprising: a cabinet including a base panel, an end panel extending upwardly from one end of said base panel, and two side walls disposed in upward directions along each side of said base panel, the panels and side walls being rigidly connected to form a cabinet having one end open and an open top; a shelf transversely positioned between said side walls, parallel to and above said base panel; a portable cold pack enclosing a refrigerant material having a freezing point below about 32° F. positioned across the upper surface of said shelf; and a dispensing plate positioned between said side walls parallel to said shelf, and immediately above said cold pack so as to be in substantial surface-to-surface contact with said cold pack.

2. The apparatus of claim 1 wherein the cabinet panels and side walls are an integral unit, and wherein a pair of parallel shelf-retaining shoulders are integrally provided in a direction parallel to the base panel along the length of the interior surface of each side wall.

3. The apparatus of claim 2 wherein the shelf is a perforated sheet of stainless steel, and wherein the dispensing plate is stainless steel.

4. The apparatus of claim 2 wherein said shelf is positioned a sufficient distance above said base panel to provide a storage compartment between said shelf and said base panel.

5. The apparatus of claim 4 wherein the top portion of said side walls and said end panel form an upper perimeter extending above said dispensing plate and surrounding said plate on three sides thereof.

6. The apparatus of claim 5 wherein said shelf and said plate are removable.

7. The apparatus of claim 6 wherein a brace member is provided between said upwardly extending side walls.

8. The apparatus of claim 7 wherein the cold pack is a plastic container enclosing a refrigerant material having a freezing point between from about 0° F. to about 32° F.

9. The apparatus of claim 8 wherein the refrigerant material is a non-toxic gel.

10. The apparatus of claim 1 wherein butter patties are held on said base panel below said shelf, and wherein butter patties are held on said dispensing plate.

* * * * *